United States Patent [19]

Bullock, Jr. et al.

[11] 4,303,702

[45] Dec. 1, 1981

[54] FLOWABILITY OF RUTILE PIGMENT

[75] Inventors: Raymond Bullock, Jr., Newark; Christian E. Rick, Wilmington; George A. Schurr, Newark, all of Del.

[73] Assignee: E. I. Du Pont de Nemours and Company, Wilmington, Del.

[21] Appl. No.: 106,403

[22] Filed: Dec. 26, 1979

Related U.S. Application Data

[63] Continuation-in-part of Ser. No. 972,971, Dec. 26, 1978, abandoned.

[51] Int. Cl.³ .............................................. C04B 31/02

[52] U.S. Cl. .................................... 427/220; 106/300
[58] Field of Search ............... 106/300; 423/268, 610; 427/220

[56] References Cited

U.S. PATENT DOCUMENTS 2,782,095  2/1957  Ames ................................... 423/268
3,940,385  2/1976  Smith ................................. 460/23.7

*Primary Examiner*—Sam Silverberg

[57] ABSTRACT

The flowability of fine particle size, rutile titanium dioxide is improved by uniformly mixing 0.05–2% by weight of naphthenic acid with the titanium dioxide.

2 Claims, 1 Drawing Figure

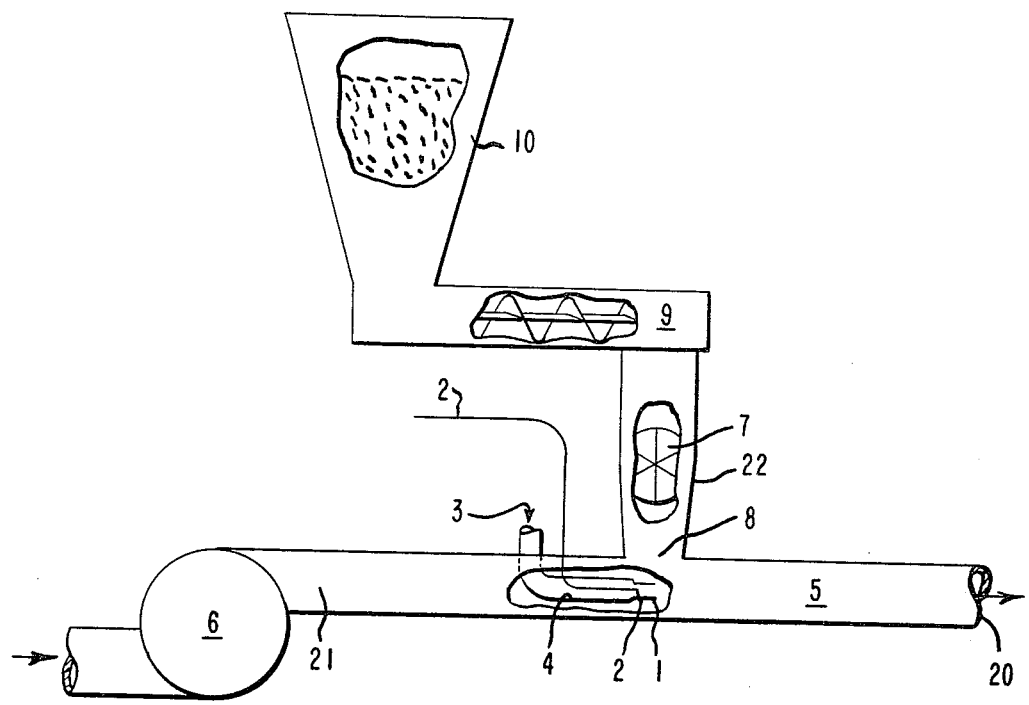

FLOWABILITY OF RUTILE PIGMENT

CROSS-REFERENCE TO RELATED APPLICATION

This is a continuation-in-part of copending application Ser. No. 972,971, filed Dec. 26, 1978 now abandoned.

DESCRIPTION

1. Technical Field

Fine particle size rutile $TiO_2$, which is used primarily in plastics, is frequently shipped in rail cars to large consumers. Historically, this material has been difficult to unload when shipped in bulk. It has now been found that treating the $TiO_2$ with naphthenic acid improves the flow characteristics of the pigment which facilitates the unloading of $TiO_2$ from rail cars.

2. Background Art

Generally, commercial grades of $TiO_2$ are coated with hydrous oxides which improve the durability and gloss of pigments. These coatings, however, do not render the pigment free-flowing. Some pigments, e.g., those used in the plastics industry, are not specially coated. These untreated or uncoated pigments are generally of fine particle size and possess much poorer flowability than treated pigments. Frequently, the pigment becomes compacted into a nonflowing mass by the vibration of the rail car it is transported in. Historically, mechanical methods have been employed to assist in unloading cars. Generally, cars are pressurized and the pigment is blown out. In that case, pressurizing the car forces material immediately above the exit hole to dislodge but does little to move surrounding pigment. Rail cars have been modified to allow gases to be blown in at strategic places to dislodge the pigment and vibrators have been installed, but these mechanisms have met with limited success and, all too frequently, the pigment must be dislodged from the walls of the car by manual shoveling.

It has now been found that treating the $TiO_2$ pigment with naphthenic acid improves the flow characteristics of the pigment which facilitates unloading of pigment in bulk shipments, such as rail cars.

DISCLOSURE OF THE INVENTION

Accordingly a fine particle size, rutile titanium dioxide pigment treated or coated with 0.05-2% by weight of naphthenic acid based on the weight of titanium dioxide has been found which possesses improved flowability as compared to uncoated pigment.

The coated pigment with improved flowability is prepared by a process comprising injecting at a high velocity a gas stream into a conveyer-pipe treatment chamber while atomizing naphthenic acid into the high velocity gas stream, thereby providing a zone of turbulence, adding particulate $TiO_2$ into the zone of turbulence, supplying a low velocity gas stream at the inlet to the conveyer-pipe treatment chamber parallel to the high velocity gas and conveying the gas, naphthenic acid and $TiO_2$ through the conveyer-pipe treatment chamber, the ratio of high velocity gas to low velocity gas being more than 3:1.

The treatment or coating of the titanium dioxide particles with naphthenic acid must be accomplished with an apparatus that provides uniform mixing of very small amounts of materials with very large amounts of different materials in particulate form. Such an apparatus comprises a conveyer-pipe treatment chamber with an entrance end and a discharge end, a nozzle for introducing a mixture of a high pressure gas and the naphthenic acid housed within the conveyer-pipe treatment chamber and means for feeding particulate titanium dioxide into an opening in the conveyer-pipe treatment chamber at the feed end, said nozzle comprising an inner tube, from which the naphthenic acid exits, concentrically arranged within an outer tube to form an annular opening between the outer tube and the outside surface of the inner tube from which the high pressure gas stream exits, said opening in the feed end of the conveyer-pipe treatment chamber located to permit particulate titanium dioxide to enter above the nozzle, said nozzle positioned so that the longitudinal axis of the nozzle and the conveyer-pipe treatment chamber coincide and so that the nozzle discharge end is beneath the opening to the conveyer-pipe treatment chamber and within a vertical projection of the opening area, the entrance end or the discharge end of the conveyer-pipe treatment chamber having means to cause a flow of low pressure gas toward the discharge end of the conveyer-pipe treatment chamber. The mixture exits from the conveyer-pipe treatment chamber uniformly mixed.

The present invention can also be described by referring to the FIGURE which is a schematic drawing of the apparatus.

DESCRIPTION OF THE DRAWING

Referring now to the FIGURE, conduit 22 is connected to feed opening 8 and is equipped with a rotary valve 7 mounted within conduit 22. Screw feeder 9 is connected to supply chamber 10 and on the discharge side to conduit 22. Particulate material enters through supply chamber 10 and is transported and metered by the screw feeder 9 to conduit 22 through rotary valve 7 which provides a seal against gases from conveyer-pipe treatment chamber 5, into conveyer-pipe treatment chamber 5 above nozzle 1. The material to be mixed with the particulate material enters through tube 2 which discharges within tube surface 4 at a controlled rate. A gas under high pressure is supplies through pipe 3 and exits nozzle 1 at a high velocity which atomizes or disperses the material from tube 2. Blower 6 supplies a gas at low velocity to the entrance end 21 of conveyer-pipe treatment chamber 5. Nozzle 1 is mounted in the center of conveyer-pipe treatment chamber 5, preferably directly under opening 8, preferably so that the end of the nozzle 1 is at the vertical center line of the opening 8. The particulate material encounters a zone of turbulence generated by the discharge of nozzle 1. The turbulence subjects the material from tube 2 to shear forces that disperse and mix it intimately and finely with the particulate material. The mixture is pneumatically conveyed to the discharge end 20 of the conveyer-pipe treatment chamber 5.

Generally, uniform mixing can be obtained with gas velocity ratios of high velocity to low velocity of more than 3:1. Preferably, the ratio of high velocity to low velocity is 4:1–10:1.

Conveyer-pipe treatment chamber 5 is generally circular in cross section but may also have a square, oval or other shape. Likewise, opening 8 may have a circular, oval, rectangular or other cross sectional shape.

Blower 6 can be eliminated and a fan or similar apparatus used at the discharge 20 of conveyer-pipe treatment chamber 5 to suck gas into the entrance end. In such a case, rotary valve 7 is not needed.

The material that exits tube 2 is the material that is relatively small in amount compared to the particulate material that is fed to 10 and may be in solid, liquid or slurry form. The only requirement is that the high velocity gas is able to move the material through the nozzle exit. The high velocity gas disperses this material into particles that are deposited on the particulate material uniformly.

The velocity through the throat of nozzle 1 is 300 ft/sec or greater. Generally, the high velocity gas is discharged from nozzle 1 at 300–2000 ft/sec (90–600 meters per second) and the low velocity gas at 80–100 ft/sec (24–30 meters per second). Thus, about 4–33% of the total gas flow entering chamber 5 is at high velocity.

The following test assesses the relative flowability of $TiO_2$ pigment which correlates with actual experience in unloading covered rail hopper cars. A 0.25 $m^3$ cylindrical hopper is equipped with a 10 cm discharge hole, air slide and vibrator at the bottom. A 70 kg sample of the pigment to be tested is charged to this hopper. The sample and hopper are then shaken for four hours on a special shaker table which subjects the hopper to the acceleration forces encountered in rail and truck travel. This shaking compacts the sample in the hopper.

The flowability properties of the pigment is then tested by unloading through the discharge port with both air slide and vibrator actuated. A free-flowing pigment is one which readily discharges from the hopper. Pigments which bridge or rat hole will not freely discharge and must be scooped or rodded from the hopper.

Pigments, which are most benefited by naphthenic acid treatment, are rutile, fine particle titanium dioxides. The use in the present process of titanium dioxide without any coating results in a greater improvement in flowability than when the surface is previously coated. Wet treatment processes are commonly used to improve the durability of titanium dioxide by coating them with hydrous oxides. The present process is not meant to exclude additives used to facilitate processing, such as micronizer aids, prior to coating with naphthenic acid. By "fine particles" is meant having a mean particle size of less than 1 micron. Preferred particles are those that have an average diameter of from about 0.15–0.25$\mu$. This fine particle pigment is particularly useful in the plastic industry because of its high strength and good dry-blend dispersibility. It is theorized that the poor flow properties of pigment are more pronounced in fine particle pigment because of an increase in van der Waals forces.

The pigments are treated with from 0.05–2.0% by weight of naphthenic acid based on the pigment. It has been found that 0.05% by weight is needed to significantly improve the flow characteristics. Too much naphthenic acid adversely effect the flow properties of the pigment and the properties of the pigment in the end-use for which it is intended. More than 2% by weight of the naphthenic acid does not result in the improved flow characteristics of this invention.

Pigments that have hydrous oxide coatings generally require 0.05–0.1% by weight naphthenic acid based on the weight of pigment. Pigments that have no hydrous oxide coatings generally require 0.1–2% by weight naphthenic acid based on the weight of pigment.

Naphthenic acid refers to a class of acids derived from petroleum, particularly that of a non-paraffinic character. They are usually monocarboxylic and monocylic and completely saturated. The most common are derivatives of cyclopentane, such as $C_5H_9COOH$ and similar derivatives of cyclohexane and cycloheptane and their homologs. Commercial naphthenic acids, which are a mixture of the above acids, are suitable for use with this invention.

The naphthenic acid should be applied after the final grinding of the pigment as earlier application may cause discoloration of the pigment. The acid must be applied with the apparatus described herein and illustrated in the FIGURE in order to achieve a thorough mixing of the acid and pigment.

The following examples further illustrate the invention. All parts, percentages and proportions that may appear in the examples are by weight unless otherwise indicated.

COMPARATIVE EXAMPLE A

An untreated $TiO_2$ pigment having a mean particle size of less than 1 micron was spread out to a depth of 1 cm on a tray. A total of 0.14 kg of naphthenic acid was uniformly sprayed on 70 kg of sample $TiO_2$ pigment. This sample was then collected and blended for 30 minutes in a V-cone blender. It was tested for flowability according to the previously described test. It would not freely discharge from the test hopper due to rat holing. A 70 kg sample of the same pigment without naphthenic acid was also tested for flowability. Its flowability was the same as the treated sample, that is, it was not free-flowing.

EXAMPLE 1

The apparatus illustrated in the FIGURE having a tube 12 3/16 inch (4.8 mm) O.D. and ⅛ inch (3.2 mm) I.D., a nozzle 1 1.315 inches (33.3 mm) O.D. and 1.049 inches (26.6 mm) I.D., a twin screw feeder 9, a Young rotary valve 7, an opening 8, 4 inches (101.6 mm) in diameter into conveyer-pipe reaction chamber 5 which was 4.5 inches (115 mm) O.D. and 4 inches (100 mm) I.D. and 60 ft (18 m) in length was used to mix naphthenic acid with titanium dioxide in fine particulate form. Naphthenic acid feed dissolved in alcohol was metered through tube 2 while titanium dioxide in particulate form was metered through feeder 9. Blower 6 provided low pressure air and nozzle 1 provided high pressure air.

The apparatus was used to treat the same type of untreated pigment used in the Comparative Example. Samples treated as described were found to flow freely when tested for flowability. Additional tests were made with the apparatus at naphthenic acid concentrations of 0.05–2.0%. All samples in which greater than 0.2% naphthenic acid flowed freely while untreated samples and samples treated at less than 0.2% naphthenic acid did not flow freely from the test hopper.

EXAMPLE 2 (BEST MODE)

Twenty tons of the $TiO_2$ were treated by the apparatus described in Example 1 with 0.3% by weight naphthenic acid based on the $TiO_2$. Seventy kg samples were collected at periodic intervals during this testing. These were all evaluated on the flowability test and were found to be free-flowing.

EXAMPLE 3 (BEST MODE)

A $TiO_2$ pigment having 1.2% alumina and 0.8% silica surface treatment having a mean particle size less than 1 micron was treated with 0.03–2% by weight naphthenic acid as described in Example 1. This pigment without naphthenic acid was found to have poor flowability. The treated pigment of this example was tested for flowability and the samples with 0.05–0.1% by weight naphthenic acid flowed freely. All others were not free-flowing.

EXAMPLE 4

In order to demonstrate that treating pigment with naphthenic acid facilitates the unloading of rail cars, treated and untreated pigment was loaded into separate compartments of a rail car.

The untreated pigment was 20 tons of R-101® (a commercially available Du Pont uncoated rutile titanium dioxide pigment of fine particle size containing about 0.30% triethanolamine). The untreated pigment was loaded into one end compartment of a three-compartment rail car. The rail car was an 80-ton Model PD-4000 manufactured by the North American Car Corp. The center compartment was left empty.

Twenty tons of R-101® were treated with 120 lbs of naphthenic acid (Commercial Grade 200 purchased from Exxon Corp.) giving an average treatment of 0.3% weight percent naphthenic acid on pigment. The treated material was loaded into the other end compartment of the rail car. The rail car was then shipped by rail approximately 240 miles.

The rail car was unloaded using standard techniques by pressurizing the rail car with air (max 15 psi). An air driven rotary vibrator (Model No. 380, manufactured by Vibco Corp.) was attached to the hopper being unloaded. After 7 hours approximately 65% by volume of the treated pigment had been unloaded. In contrast, after 7 hours only about 35% by volume of the untreated pigment had been unloaded.

INDUSTRIAL APPLICABILITY

The naphthenic acid coated $TiO_2$ of this invention is useful in normal pigment applications and permits easier unloading of rail cars of $TiO_2$ that have been compacted during transit from one site to another. The process of the invention is the method of mixing uniformly naphthenic acid and $TiO_2$ at the levels described herein to achieve improved flowability.

We claim:

1. A method of improving flowability of bulk, fine particle size, rutile titanium dioxide pigment that facilitates unloading or transferring said pigment comprising injecting at a high velocity a gas stream into a chamber while atomizing naphthenic acid into the high velocity gas stream, thereby providing a zone of turbulence, adding particulate titanium dioxide having a mean particle size less than 1 micron into the zone of turbulence, supplying a low velocity gas stream at the inlet to the chamber parallel to the high velocity gas and conveying the gas, naphthenic acid and titanium dioxide through the chamber, the ratio of high velocity gas to low velocity gas being more than 3:1 and the amount of naphthenic acid is 0.05–2% by weight based on the weight of titanium dioxide.

2. A method of improving flowability of bulk titanium dioxide that facilitates unloading or transferring of the titanium dioxide comprising introducing a mixture of naphthenic acid and a high pressure gas through a nozzle into a conveyer-pipe treatment chamber, feeding particulate titanium dioxide into an opening in the conveyer-pipe treatment chamber at the feed end located to permit the titanium dioxide to enter above the nozzle, said nozzle positioned so that the logitudinal axis of the nozzle and the conveyer-pipe treatment chamber coincide so that the titanium dioxide falls in to a zone of turbulence created by the high velocity gas stream and transporting the gas, titanium dioxide and naphthenic acid to the discharge end of the conveyer-pipe treatment chamber with a low pressure gas that enters the chamber parallel to the high pressure gas said naphthenic acid being added in sufficient amount to provide a coating on the titanium dioxide of 0.05–2% by weight based on the weight of titanium dioxide.

* * * * *